(12) United States Patent
Jones et al.

(10) Patent No.: US 9,026,774 B2
(45) Date of Patent: May 5, 2015

(54) IC WITH BOOT TRANSACTION TRANSLATION AND RELATED METHODS

(75) Inventors: Andrew Michael Jones, Bristol (GB); Stuart Ryan, Bristol (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 244 days.

(21) Appl. No.: 13/560,294

(22) Filed: Jul. 27, 2012

(65) Prior Publication Data

US 2013/0031347 A1    Jan. 31, 2013

(30) Foreign Application Priority Data

Jul. 28, 2011 (GB) .................................. 1112970.7

(51) Int. Cl.
*G06F 9/00* (2006.01)
*G06F 9/44* (2006.01)
*G06F 12/06* (2006.01)

(52) U.S. Cl.
CPC .......... *G06F 9/4403* (2013.01); *G06F 12/0638* (2013.01)

(58) Field of Classification Search
CPC .... G06F 9/4401; G06F 13/10; G06F 9/45504
USPC .......................................................... 713/2
See application file for complete search history.

(56) References Cited

U.S. PATENT DOCUMENTS

| | | | |
|---|---|---|---|
| 5,088,033 A * | 2/1992 | Binkley et al. | 703/24 |
| 5,255,384 A * | 10/1993 | Sachs et al. | 711/207 |
| 5,410,707 A | 4/1995 | Bell | |
| 5,473,775 A * | 12/1995 | Sakai et al. | 713/2 |
| 5,522,076 A * | 5/1996 | Dewa et al. | 713/2 |
| 5,551,007 A * | 8/1996 | Miyazaki et al. | 711/148 |
| 5,696,923 A * | 12/1997 | Robertson et al. | 711/202 |
| 5,983,012 A * | 11/1999 | Bianchi et al. | 703/23 |
| 5,987,536 A * | 11/1999 | Johnson et al. | 710/36 |
| 6,049,854 A * | 4/2000 | Bedarida | 711/153 |
| 6,272,611 B1 * | 8/2001 | Wu | 711/173 |
| 6,282,643 B1 * | 8/2001 | Cromer et al. | 713/2 |
| 6,321,332 B1 * | 11/2001 | Nelson et al. | 713/2 |
| 6,397,315 B1 * | 5/2002 | Rahman et al. | 711/169 |
| 6,598,157 B1 * | 7/2003 | McKee | 713/1 |

(Continued)

FOREIGN PATENT DOCUMENTS

| | | |
|---|---|---|
| JP | 2000259404 A | 9/2000 |
| WO | WO 02/04886 A1 | 1/2002 |
| WO | 02/48860 | 6/2002 |

OTHER PUBLICATIONS

Great Britain Search Report and Written Opinion dated Nov. 16, 2011 from corresponding Great Britain Application No. 1112970.7.

*Primary Examiner* — Thomas Lee
*Assistant Examiner* — Santosh R Poudel
(74) *Attorney, Agent, or Firm* — Allen, Dyer, Doppelt, Milbrath & Gilchrist, P.A.

(57) ABSTRACT

A first arrangement including an interface configured to receive transactions with an address from a second arrangement having a first memory space; a translator configured to translate an address of a first type of received transaction to a second memory space of the first arrangement, the second memory space being different to the first memory space; and boot logic configured to map a boot transaction of the received transactions to a boot region in the second memory space.

40 Claims, 5 Drawing Sheets

(56) References Cited

U.S. PATENT DOCUMENTS

| | | | |
|---|---|---|---|
| 6,813,522 B1* | 11/2004 | Schwarm et al. | 700/5 |
| 7,363,484 B2* | 4/2008 | Davis et al. | 713/100 |
| 7,389,384 B2* | 6/2008 | Van Steenwijk et al. | 711/119 |
| 7,702,893 B1* | 4/2010 | Rally et al. | 713/1 |
| 8,063,660 B1* | 11/2011 | Strader et al. | 326/40 |
| 8,700,851 B2* | 4/2014 | Togawa | 711/118 |
| 8,799,555 B2* | 8/2014 | Post et al. | 711/103 |
| 2002/0016891 A1* | 2/2002 | Noel et al. | 711/153 |
| 2002/0029365 A1* | 3/2002 | Sato et al. | 714/763 |
| 2002/0161452 A1* | 10/2002 | Peltier | 700/2 |
| 2003/0005071 A1* | 1/2003 | Kanoh | 709/213 |
| 2004/0003129 A1* | 1/2004 | Zimmer et al. | 709/310 |
| 2004/0015671 A1* | 1/2004 | Kondo | 711/173 |
| 2004/0186930 A1* | 9/2004 | Gadkari et al. | 710/22 |
| 2004/0250057 A1* | 12/2004 | Fujita et al. | 713/1 |
| 2005/0015582 A1* | 1/2005 | Shida et al. | 713/2 |
| 2005/0055530 A1* | 3/2005 | Wu et al. | 711/203 |
| 2005/0210230 A1* | 9/2005 | Kuroiwa et al. | 713/1 |
| 2005/0223186 A1* | 10/2005 | Belevich et al. | 711/202 |
| 2005/0283598 A1 | 12/2005 | Gaskins | |
| 2006/0005005 A1* | 1/2006 | Lee | 713/2 |
| 2006/0047888 A1* | 3/2006 | Nishihara et al. | 711/103 |
| 2006/0112256 A1* | 5/2006 | Lee | 711/205 |
| 2006/0129786 A1* | 6/2006 | Yamazaki | 711/206 |
| 2006/0218425 A1* | 9/2006 | Ding et al. | 713/323 |
| 2007/0180269 A1* | 8/2007 | Irish et al. | 713/193 |
| 2007/0198804 A1* | 8/2007 | Moyer | 711/202 |
| 2007/0239960 A1* | 10/2007 | Ito et al. | 711/207 |
| 2007/0260827 A1* | 11/2007 | Zimmer et al. | 711/154 |
| 2007/0266202 A1* | 11/2007 | Mukaida | 711/103 |
| 2008/0022163 A1* | 1/2008 | Tanaka et al. | 714/710 |
| 2008/0040596 A1* | 2/2008 | Mai et al. | 713/2 |
| 2008/0155217 A1* | 6/2008 | Kato et al. | 711/163 |
| 2008/0222409 A1* | 9/2008 | Chung et al. | 713/2 |
| 2008/0229090 A1* | 9/2008 | Choi et al. | 713/2 |
| 2008/0263314 A1* | 10/2008 | Kaburaki | 711/206 |
| 2009/0006754 A1* | 1/2009 | Luick | 711/122 |
| 2009/0013148 A1* | 1/2009 | Eggleston | 711/203 |
| 2009/0113196 A1* | 4/2009 | Jan et al. | 713/2 |
| 2009/0157949 A1* | 6/2009 | Leibowitz | 711/103 |
| 2009/0172269 A1* | 7/2009 | Song et al. | 711/103 |
| 2009/0307481 A1* | 12/2009 | Wisecup et al. | 713/2 |
| 2009/0310408 A1* | 12/2009 | Lee et al. | 365/185.03 |
| 2010/0011156 A1* | 1/2010 | Yim et al. | 711/103 |
| 2010/0082968 A1* | 4/2010 | Beverly | 713/2 |
| 2010/0115191 A1* | 5/2010 | Hampel et al. | 711/103 |
| 2010/0262818 A1* | 10/2010 | Lee | 713/2 |
| 2011/0018623 A1* | 1/2011 | More et al. | 327/564 |
| 2011/0072190 A1* | 3/2011 | Borracini et al. | 711/103 |
| 2011/0138160 A1* | 6/2011 | Sato et al. | 713/2 |
| 2011/0210440 A1* | 9/2011 | Sabatini et al. | 257/692 |
| 2011/0258364 A1* | 10/2011 | Leung | 711/103 |
| 2011/0283051 A1* | 11/2011 | Lieber et al. | 711/103 |
| 2012/0005557 A1* | 1/2012 | Mardiks et al. | 714/763 |
| 2012/0017071 A1* | 1/2012 | Shahar et al. | 713/2 |
| 2012/0110298 A1* | 5/2012 | Matsuse | 711/206 |
| 2012/0191961 A1* | 7/2012 | Wu et al. | 713/2 |

* cited by examiner

IC WITH BOOT TRANSACTION TRANSLATION AND RELATED METHODS

CROSS REFERENCE TO RELATED APPLICATIONS

This application claims the priority benefit of Great Britain patent application number 1112970.7, filed on Jul. 28, 2011, which is hereby incorporated by reference to the maximum extent allowable by law.

BACKGROUND

1. Technical Field

The present disclosure relates to an arrangement and a method, and in particular but not exclusively for use in relation to booting.

2. Discussion of the Related Art

It has been proposed to provide a system in package having two or more dies. The dies may be arranged to share a memory space. A number of different considerations may need to be taken into account such as compatible memory maps, amount of address space, scalability to a required address space and/or the mixing and matching of dies having different length addresses.

SUMMARY

According to a first aspect, there is provided a first arrangement comprising: an interface configured to receive transactions with an address from a second arrangement having a first memory space; a translator configured to translate an address of a first type of received transaction to a second memory space of said first arrangement, said second memory space being different to said first memory space; and boot logic configured to map a boot transaction of said received transactions to a boot region in said second memory space.

According to a further aspect, there is provided a method comprising: receiving transactions with an address associated with a first memory space; translating an address of a first type of received transaction to a second memory space, said second memory space being different to said first memory space; and mapping a boot transaction of said received transactions to a boot region in said second memory space.

BRIEF DESCRIPTION OF THE DRAWINGS

For an understanding of some embodiments, reference will be made by way of example only to the accompanying Figures in which.

DETAILED DESCRIPTION

Some embodiments may be used where there are more than one die within a single package. In particular, a plurality of integrated circuit dies may be incorporated within a single package. In the following examples, a single package having two dies is described. However it is appreciated that this is by way of example only and more than two dies may be provided in some embodiments in the same single package.

For example, the decreasing feature size in CMOS silicon processes allows digital logic to shrink significantly in successive fabrication technology. For example, an area reduction of 55% may be obtained when comparing a digital logic cell implemented in 90 nanometer technology with a digital logic cell implemented in 65 nanometer technology. However, analog and input/output cells tend to shrink much less if at all in these implementations. This may lead to increasingly pad limited designs in many complex system-on-chips (SoC). A pad limited design can be considered wasteful if the digital logic is not implemented as densely as it might be if it were the determining factor in the device area.

Another factor in some embodiments is that the transition, for example, to a sub 32 nanometer design may introduce a dichotomy between supporting low voltage, high speed input/output logic such as DDR3 (Double Data Rate) RAM (Random Access Memory) 1.5 V @ 800 MHz or higher on the one hand and higher voltage interconnect technologies, for example HDMI (High Definition Multimedia Interface), SATA (Serial Advanced Technology Attachment), USB3 (Universal Serial Bus), etc. The lower voltage DDR3 interface may require a lower transistor gate oxide thickness as compared to the HDMI technology. This may be incompatible within a standard process.

Porting of high speed analog interfaces to a new process consumes a lot of resource in terms of time and expert attention. By decoupling the implementation of analog blocks from that of digital blocks of the system may allow a reduction in time to working silicon.

By splitting a traditional monolithic system-on-chip into a plurality of dies in order to form a system in package comprising two or more dies, advantages can be achieved. For example, each die may be designed to provide a particular function which may require various different mixes of analog and digital circuitry in the implementation of the particular function. This means that in some embodiments, it may be possible to use the same die or same design for a die in different packages. This modularity may reduce design time.

Embodiments may be used where there are two or more dies in the package. Embodiments may be used where the dies are manufactured in different technologies. Embodiments may be used alternatively or additionally where it is advantageous for at least one of the dies to be certified, validated or tested independently for conformance to, for example, a standard. Embodiments may alternatively or additionally be used where one of the dies contains special purpose logic to drives specific wireless, optical or electrical interfaces so that the other die or dies can be manufactured independently and not incur any costs associated with the special purpose logic. Embodiments may alternatively or additionally be used where one of the dies contains information, for example encryption information, which is to be withheld from the designers/manufacturers of the other die or dies. Embodiments may alternatively or additionally be used where one of the dies contains high density RAM (Random Access Memory) or ROM (Read Only Memory) and it is preferable to separate this from standard high speed logic for reasons of fabrication yield and/or product flexibility.

It should be appreciated that some embodiments may have additional or alternative advantages other than those discussed previously.

Figure 1:
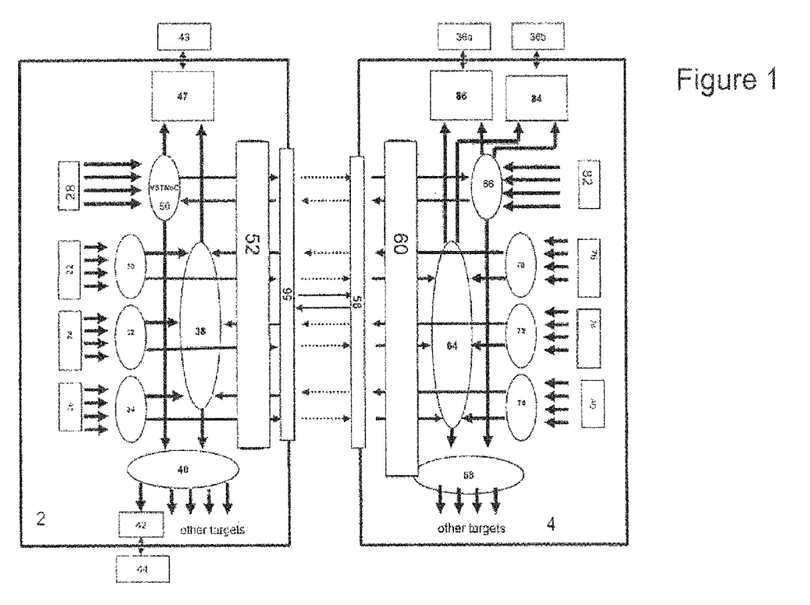
FIG. 1 schematically shows a package comprising a first die and a second die.

Reference will now be made to FIG. 1 which shows an example of a system in which embodiments may be used.

Some embodiments may be used where there are more than one die within a single package. In particular, a plurality of integrated circuit dies may be incorporated within a single package. In the following example, a single package having two dies is described. However, it is appreciated that this is by way of example only and more than two dies may be provided in some embodiments in the same package.

Alternative embodiments may be used for communication between two different entities. Those entities may be integrated circuits or other types of circuits. These two or more entities may not be included in a single package but for example may be provided on a circuit board.

Usually, most of the communications between the dies will be read and write transactions to the memory address space of either chip. If 32 bits physical addressing is used, this may lead to a limitation of $2^{32}$=4 GBytes of addressable locations. In some embodiments, a single die can use up most of this addressable location leading to the consideration of how to integrate two dies when the aggregate address space exceeds 4 GBytes. Further, in order for the dies to communicate, they should have compatible physical addresses. This means that the addresses allocated to functional elements in one die, should not be allocated in the other die.

Reference is made to FIG. 1 which schematically shows a system in packet 1 having a first die 2 and a second die 4.

The first die may be a set-top application specific die and the second die may be a media processing engine. These two dies may be used in a set-top box. The first die may have a lower density as compared to the second die and may contain most of the input/output and analog circuitry of the two dies. The second die contains most of the processing engines, memory and higher density logic.

It should be appreciated that the nature and function of the two or more dies can cover a wide range of applications and is not limited to this one example.

By way of example, the first die 2 comprises a first initiator 22, a second initiator 24 and a third initiator 26. The first die 2 also comprises a CPU 28. In one embodiment, the initiators 22, 24 and 26 are configured to issue requests or transactions. By way of example only, these requests may comprise memory transactions for a memory 36a or 36b associated with the second die 4 or a memory 49 or 44 associated with the first die. Each of these initiators is configured to issue the requests to a respective bus node 30, 32 and 34. It should be appreciated that responses to the transactions will be forwarded from the bus node to the associated initiator.

Each of the bus nodes 30, 32 and 34 is configured to put the requests from the initiators onto a network-on-chip 38. The network-on-chip provides a communication path with a peripheral interconnect 40. The peripheral interconnect 40 has a communication path with for example an external memory interface 42. The external memory interface 42 may interface with externally provided memory such as flash memory 44. The peripheral interconnect 40 may in some embodiments also provide a communication path to one or more other targets.

The network-on-chip 38 also provides a communication path to a memory interface 47 which comprises a memory encryption system and a memory controller. The memory encryption system is a block of logic which is able to police accesses to DRAM and scramble the contents to thwart eavesdroppers. The memory controller is arranged to interface with external memory. That external memory may for example be a DDR (double data rate RAM random access memory). This is by way of example only and the memory interface may interface with any other suitable type of memory.

The CPU 28 is configured to interface with a CPU network-on-chip 50. The CPU network-on-chip 50 is configured to interface with the peripheral interconnect 40 and the memory interface 47.

The first die also has an address translation unit 52. The address translation unit 52 has a translation store. The address translation unit 52 will be described in more detail hereinafter.

A communication path is provided between the NoC 38 and the CPU NoC 50 and the address translation unit 52.

The first die has an interface 56 which is configured to transmit traffic to the second die and to receive traffic from the second die.

The second die 4 comprises an interface 58 which is configured to receive traffic from the first die 2 and to transmit traffic from the second die to the first die. The interface 58 is configured to communicate with an address translation unit 60 on the second die. Associated with the address translation unit 60 is a translation store. The address translation unit 60 will be described in more detail later.

The address translation unit 60 is configured to communicate with a first network-on-chip 64 and a CPU network-on-chip 66. The first network-on-chip 64 is configured to interface with a peripheral interconnect 68. The peripheral interconnect 68 is configured to interface with one or more targets. The first network-on-chip 64 is configured to interface with a first bus node 70, a second bus 72 and a third bus node 74. Each of the nodes is configured to interface with a respective initiator 76, 78 and 80.

The CPU network-on-chip 66 is configured to interface with a CPU 82.

The second die is also provided with a first memory interface 84 and a second memory interface 86. Each of the memory interfaces 84 and 86 comprises a respective MES as well as a respective memory controller. The first memory interface is configured to interface with the first memory 36a and the second memory interface is configured to interface with the second memory 36b.

It should be appreciated that FIG. 1 is a schematic view of the two dies. By way of example only, the initiators 22, 24 and 26 and/or the CPU 28 may require access to the memories 36a and 36b which are interfaced by the second die 4. Likewise, the CPU 82 and the initiators 76, 78 and 80 of the second die may require access to the memories interfaced by the first die 2, for example, the DDR 40 and/or the flash memory 44.

By way of example only, a request from the CPU 28 of the first die may be routed to the CPU network-on-chip 50 of the first die, then to the address translation unit and then to the first die interface 56. The first die interface 56 passes the request to the interface 58 of the second die. The request passes through the address translation unit to the CPU network-on-chip 66 of the second die. From the CPU network-on-chip, the request can be forwarded to the first memory interface 84, the second memory interface 86 and/or the peripheral interconnect 68.

For requests from the initiators 22, 24 and 26 of the first die, the routing is as follows: respective bus node to network-on-chip 38 to address translation unit 52 to interface 56 of the first die to interface 58 of the second die to address translation unit 60 to network-on-chip 64 and to one or more of the first memory interfaces 84, second memory interface 86 and peripheral interconnect 68.

It should be appreciated that responses to the respective requests will generally follow a reversed route back to the respective initiator or CPU.

For transactions issued by the CPU 82 or the initiators 76, 78 and 80 of the second die, the transactions generally follow the following path: to the CPU network-on-chip 66 in case of a transaction from the CPU and to the network-on-chip 64 from the respective bus node 70, 72 or 74 in the case of a transaction issued by one of the initiators. From the network-on-chip 66 or 64, the transaction is routed via the address translation unit 60 to the interface 58 of the second die. From the interface 58 of the second die, the transactions are routed to the interface 56 of the first die and via the address translation unit 52 to the respective network-on-chip 38 or 50. In particular, transactions from the CPU will be routed to the CPU network-on-chip and transactions from the initiators 76, 78 or 80 will be routed to the network-on-chip 38. The transactions will then be routed either to the memory interface 47 or to the peripheral interconnect 40 to allow access to for example the flash memory 44, other targets or the DDR 49. Again, the responses may be routed along a reverse path to the respective initiators.

It should be appreciated that the various initiators or CPUs may issue requests intended for memory space associated with the die which includes the respective initiators or CPUs.

Embodiments also allow transactions from one die to access address space managed by the other die.

Some embodiments may provide flexible address space. For example, one of the dies may have a larger DRAM space associated with it as compared to the other die. By way of example only, the second die 4 may have a larger address space associated with it as compared to the first die 2.

In some embodiments, the address length may be the same in both dies. In alternative embodiments, the address length may be different in different dies. By way of example only, both address lengths may be 32 bits, or 40 bits. In one alternative, one die may have a 32 bit address length and the other die may have a 40 bits address length. It should be appreciated that these figures are given by way of example only and other embodiments may have different address lengths.

One option which may be used in some embodiments is to design the two dies with compatible memory maps. For example, addresses 0 to k are associated with the first die and addresses k+1 to n are associated with the second die. However, such an arrangement may not be appropriate in all embodiments. In some situations, such a division of memory space may not be sufficient for the particular requirements of a particular implementation. In some embodiments, such an option may not scale to 40 bits. Some embodiments which have 32 and 40 bit requirements in different dies may not map to such a memory map.

In some embodiments, address re-mapping is provided by the respective address translation units on the respective dies. In one embodiment, the address translation unit will map fields from the first die to the second die and vice versa. For example, the address translation unit of the first die may map fields from the first die to the second die for the outgoing requests. Alternatively or additionally, the address translation unit may map fields received from the second die to those of the first die. In some embodiments, the address translation unit may be removed from one die and the address translation unit on the other die will provide the mapping from the first die to the second die and from the second die to the first die.

The fields which may be mapped by the address translation unit comprise one or more of the following fields: die identity field, source identity field, transaction identity field and address field.

In one embodiment, the received transaction from the other die is aimed at the address translation unit. In some embodiments, the receiving die may be responsible for the translation of memory accesses. However, in some alternative embodiments, one interface of a die may be responsible for the translation of the memory accesses regardless of whether that die is the initiator or target of the memory access. This may be advantageous where there are backward compatibility issues. For example, one die may thus be provided without any address translation facilities, this being handled by the other die.

Figure 4:
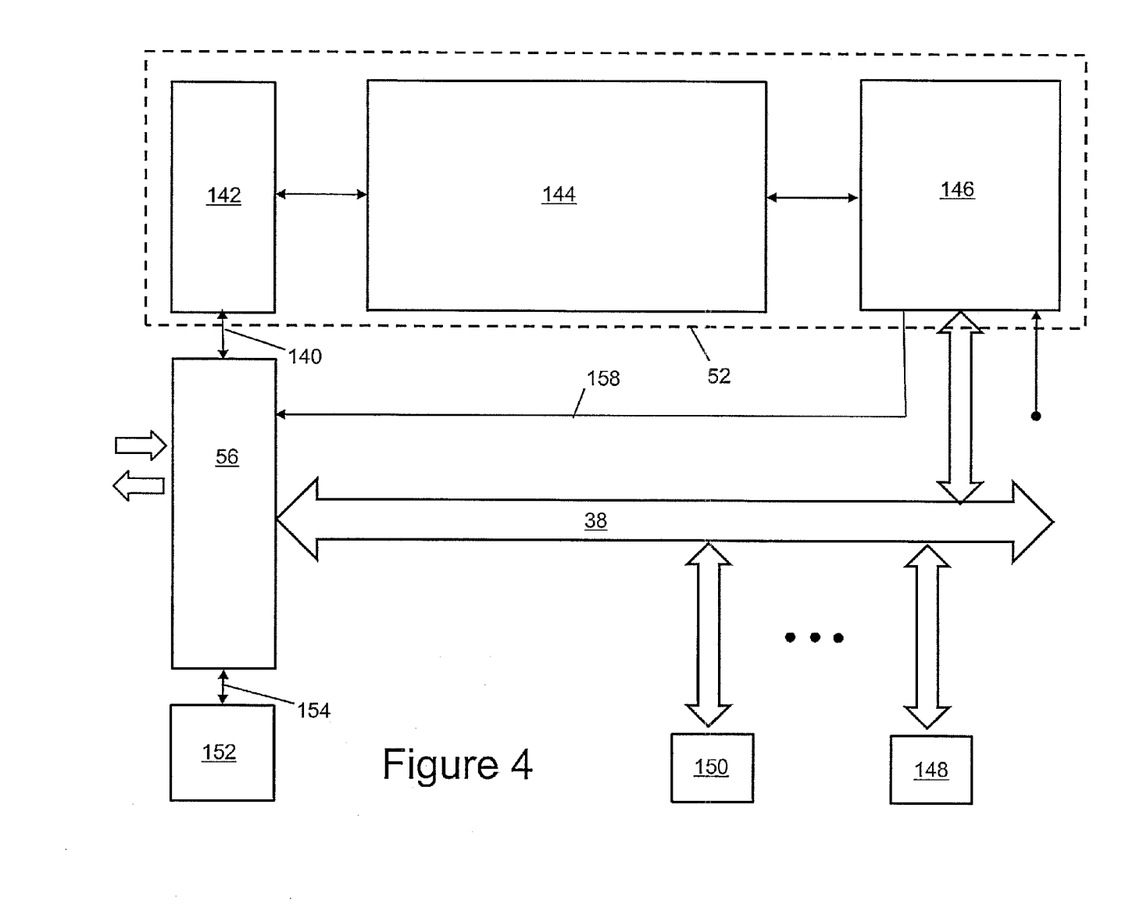
FIG. 4 shows the blocks of the first die used for a remapping function.

Reference is now made to FIG. 4 which shows the functional entities which provide the remapping function. It should be appreciated that the arrangement of FIG. 4 is provided on the first die 2. However, in alternative embodiments, at least some of the circuitry shown in FIG. 4 will also or alternatively be provided on the second die 4.

Those entities which are the same as described in FIG. 1 are referenced by the same reference numerals. In the arrangement shown in FIG. 4, the interface 56 is shown. The interface is arranged to communicate with the address translation unit 52. A communication path 140 is provided between the interface 56 and the address translation unit 52. The address translation unit 52 comprises translation store logic 142, content addressable memory 144 and a register bank controller 146. The address translation unit is configured to communicate with other entities via the network-on-chip 38. Block 150 represents other on-chip logic and may for example be one of the targets 22, 24 or 26 or any other suitable logic.

A boot region 148 is provided. This boot region is an area of memory which contains boot code 4 for an off die device. In this example, this would be boot code for the CPU on the second die. The memory can be any suitable memory. For example, the boot region may be flash memory or alternatively may be realised by an internal ROM, RAM or external DRAM or SRAM. In one embodiment, logic on the first die will authenticate and decrypt the contents of the flash memory before relocating it to DRAM where is more conveniently accessed for example faster and more securely by later booting devices.

The address translation unit is also coupled by communication part 154 to boot address remapping logic 152.

The interface 56 when it receives a request packet from the second die, copies the address part of the packet either to the address translation unit 52 or the boot address remapping logic. In particular, the address part of the packet will be copied to the translation store logic 142 of the address translation unit. The interface 56 will make a decision as to where the address part of the packet is to be copied based on the state of the translation store enable signal which is referenced 158. This translation store enable signal will be described in more detail later but is provided from the register bank controller 146 to the interface 56.

If the translation store enable signal is asserted then the packet address is copied to the translation store logic 142. Otherwise, the address is copied to the boot address remapping logic 152 and the register bank controller. Responsive to this address one block will return a new address which will be used to route the packet on the on-chip interconnect i.e. the network-on-chip 38 in the example shown in FIG. 4. This providing of a new address will be described in more detail later.

The translation store logic 142 is used when the translation store signal is enabled. The translation store logic will map an incoming address to an accessible address on the first die, depending on its configuration. The CAM 144 receives an input address, compares it to a list of addresses stored in the CAM and outputs a local address if there is a match.

The controller allows the CAM entries to be read and written by making them appear as pseudo registers.

Figure 2:
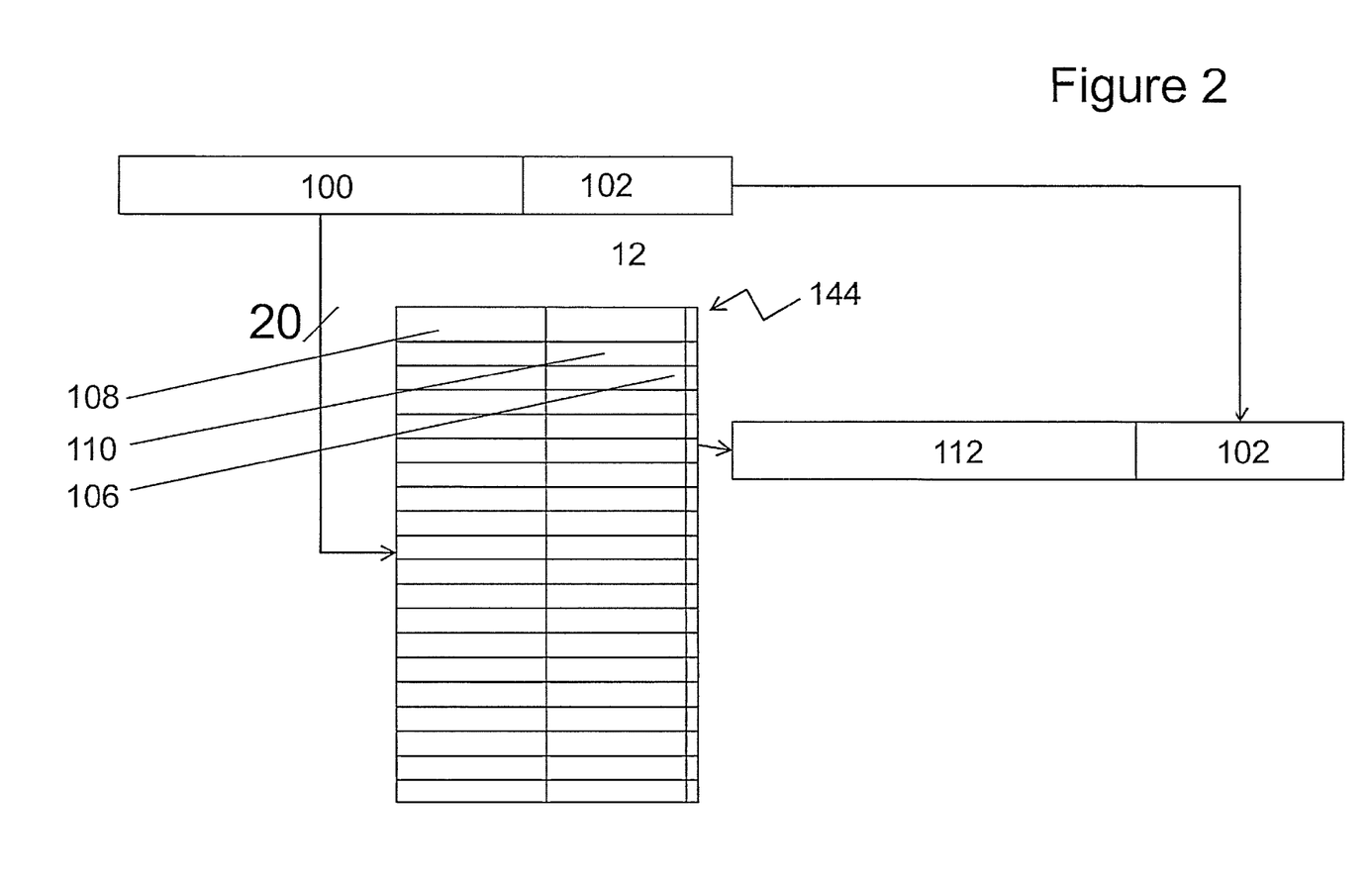
FIG. 2 schematically illustrates an address translation process.

Reference is made to FIG. 2 which shows the address translation process provided by the address translation unit.

In particular, the translation is provided by the translation store logic 142 in conjunction with the CAM 144. The CAM 144 acts as a translation store register unit. The incoming physical address is the address in a received transaction. The first part 100 of the address comprises a physical page number PPN. The second part 102 of the address is an offset. This offset remains unchanged by the translation process. In the example shown, the incoming physical address is 32 bits of which 12 are the offset part of the address and 20 bits are the physical page number address.

The physical page number 100 is used as an input to the translation store CAM 144. Effectively, the CAM will translate the incoming physical page number in column 108 to the corresponding outgoing physical page number in column 110. The offset is then added to the outgoing physical page number to define the physical address to be used on the die receiving the transaction. The table may also comprise a bit 106 which indicates whether or not a particular address is valid or not. Thus, the address translation process uses the content addressable memory to match an incoming physical page number with a CAM entry and replace the matched PPN for the outgoing physical address 112. The offset is then added to the outgoing PPN.

If none of the entries in the CAM match the incoming address, in one embodiment the address is left untranslated. Alternatively or additionally, the unmatched address is translated to a default address.

Translation store registers of the CAM may have a default configuration at reset. The translation store registers are set by the register bank controller.

The CAM may be a ternary content addressable memory in which entry bits may be "1", "0" or "X". X is a "don't care" state.

These translation store registers may be configured by a sequence of pokes from a CPU on the local die and/or a sequence of pokes from a CPU on the remote die.

The translation store is initially disabled or is disabled on reset. The translation store enable signal is de-asserted at this time. The translation store is first configured by writing into translation store registers to specify the physical page number to physical page number translation. This is to populate the table shown in FIG. 2. The configuration of the translation store is performed under the control of the register bank controller 146. The translation store is configured by writing to the translation store registers. In particular, data from the CPU on the local die is used to populate the table.

After all of the translation store entries have been written into the translation store table, a completion register is finally written to. This may be a register of the register bank controller 146. The higher order bits of the value written into the completion register may have a specified designated value, a so-called magic value, for the writing of the configuration table to succeed. If the entry into the completion register does not have the specified designated value, the whole write into the configuration table is ignored.

In one embodiment, if the value of bit 0 is set (for example to 1), then this serves to enable the translation store which will translate all subsequent accesses according to its programming. This will allow the translation store enable signal to be asserted. If, additionally, or alternatively, bit 1 is set (for example to 1), then the translation store is locked and the translation stores entries cannot be updated without resetting the die.

This specific designated value is chosen to prevent accidental setting and can be any value commonly used. For example, the top 30 bits may be 1010101010101010101010101010. It should be appreciated that the bottom two bits are bits 0 and 1 as described above.

As previously described, the boot address remapping logic is used when the translation store enable signal is deasserted. The boot address remapping logic maps the incoming address either to the boot region from where the boot code may be fetched or the controller 146 which allows a configuration of the translation store. In this regard, reference is made to FIG. 3 which schematically show the process by which incoming addresses are translated when the translation store enable signal is deasserted. The boot address remapping logic comprises three registers 162, 164 and 166. The boot address remapping logic 152 also comprises a multiplexer 168. The incoming address is latched into an incoming address register 164. Specific fields of the incoming address are copied into a boot region register 162 and a register bank register 166. In the example shown in FIG. 3, the low order bits 0 to 19 are copied to the boot region register 162 and the register bank register 166. However, this is by way of example only and other size or positioned address fields may be used in alternative embodiments.

Figure 3:
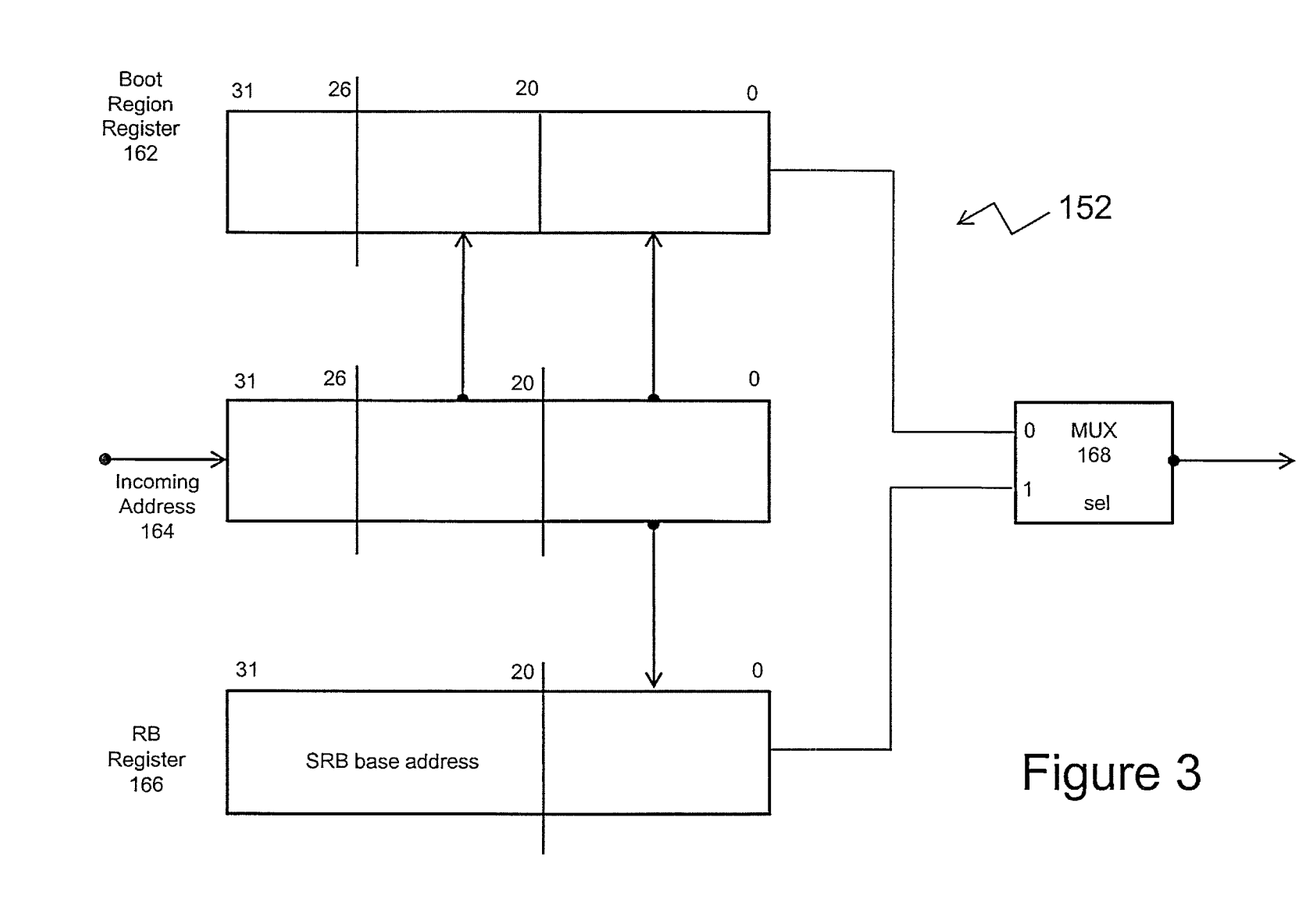
FIG. 3 schematically shows boot address remapping logic.

In the embodiment shown in FIG. 3, some middle bits of the incoming address are also copied to the boot region register 162. These middle bits may be bits 20 to 25. However, it should be appreciated that in alternative embodiments, other parts of the address and/or address sizes may also be copied.

In each of the boot region register 162 and the register bank registers, the higher order bits are constant. In the example shown, bits 31 to 20 are constant for the register bank register 166. Bits 31 to 26 are constant for the boot region register 162. In this example, the constants are hardwired. However this is by way of example.

It should be appreciated that in alternative embodiments, the number of higher order bits which are constant may vary from the example shown. In some embodiments, the register bank constants may be configurable following reset. When the boot region register and the register bank register have been populated by the field copied from the incoming address, the multiplexer 168 selects which of the two registers will be the output of the process. The multiplexer selection is determined, in this example by whether the middle field is all "1s" in which case the controller register bank is selected otherwise the boot region register is selected. This has the effect of placing the controller register bank at the top of the initial address space with boot region register at the bottom of the address space.

Thus, at reset, all of the dies will present a standard address space to the other dies in which only the bottom x bits are significant. In one embodiment, x may be 26 bits (64 MB). In alternative embodiments x can be any other suitable value. In alternative embodiments, x may be between 16 and 31.

In this address space, the lowest 63 MB are mapped to a potential boot address space and 1 MB is mapped onto the translation store register bank. This is to allow remote CPUs to boot without first having to configure the translation stores. In other words, a request from a remote CPU will be mapped to this boot RAM address space.

On boot, any request received from the CPU on a different die, will be directed by the bottom 63 MB as described in relation to FIG. 3. This is even before the translation store has been configured by the translation store unit.

Figure 5:
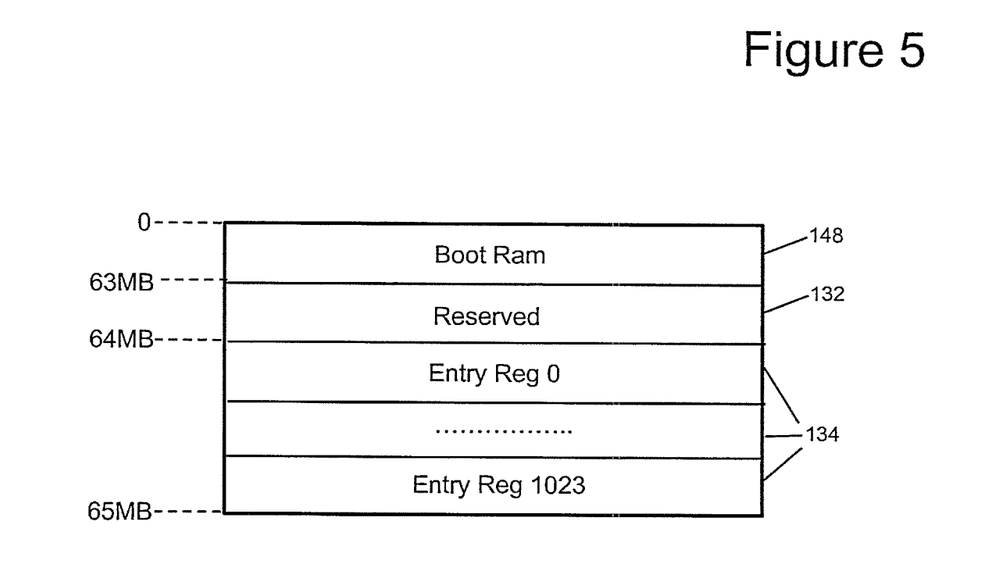
FIG. 5 shows part of the address space.

Reference is made to FIG. 5 which shows schematically the bottom part of the address space. As can be seen, the boot region is referenced 148 and occupies address space 0-63 MB. There is a reserved space 132 of 1 MB. This may be used or omitted in some embodiments. There is also a part of the address space 134 which is 1 megabyte and is mapped to the register bank controller. The sizes of the various regions of the memory are by way of example only. This arrangement will allow remote CPUs (that is CPUs on a different die) to boot without having to configure the translation stores.

Embodiments may allow a CPU on a remote die to boot before translation is enabled as the bottom 63 MB will be mapped onto the location of the Boot instructions.

In embodiments the CPU, which is local to the address translation unit, (that is on the same die) is able to configure the translation buffer before using it.

In some embodiments, a device is booted via a proxy from a location whose real physical address is unknown at boot time.

The second device (the proxy) aliases the memory, where the boot code is stored, into where the first device will fetch from and concurrently aliases the translation store configuration registers into this space too. This allows the first device to subsequently configure how the physical address space of the second device will appear to it. The code to effect this configuration is contained in the boot code which has been fetched from the aliases memory.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A first integrated circuit (IC) having a first memory space, the first IC comprising:
an interface configured to receive a plurality of transactions with respective second type addresses from a second IC having a second memory space;
an address translator configured to translate the respective second type addresses to the first memory space, said second memory space being different from to said first memory space; and
boot logic circuitry configured to determine if a given transaction is a boot transaction, then map the boot transaction from said plurality of transactions to a boot region in said first memory space, the boot region comprising boot code for the second IC.

2. The first IC as claimed in claim 1, wherein said address translator comprises memory having a plurality of entries, each entry comprising input addresses receivable in said plurality of transactions and respective translated output addresses.

3. The first IC as claimed in claim 1, wherein said address translator operates in a first mode in which said address translator is disabled for translation and a second mode in which said address translator is enabled for translation.

4. The first IC as claimed in claim 3, wherein said address translator is configured to provide a signal to said interface indicating if said address translator is in said first mode or said second mode.

5. The first IC as claimed in claim 3, wherein said interface is configured to pass the plurality of transactions to said address translator when said address translator is in the second mode.

6. The first IC as claimed in claim 3, wherein said interface is configured to pass the plurality of transactions to said boot logic circuitry when said address translator is in the first mode.

7. The first IC as claimed in claim 3, wherein when said address translator is in the first mode, said interface is configured to pass said boot transaction to said boot logic circuitry.

8. The first IC as claimed in claim 7, wherein said boot logic circuitry is configured to determine whether the given transaction includes an address translation operation.

9. The first IC as claimed in claim 7, wherein when the given transaction includes an address translation operation, said boot logic circuitry is configured to direct the given transaction said address translation unit.

10. The first IC as claimed in claim 7, wherein said boot logic circuitry comprises a boot region register and an address translator register; and wherein said boot logic circuitry is configured to copy at least part of an address of given transaction to at least one of said boot region register and the address translator register.

11. The first IC as claimed in claim 10, wherein said at least part of said address comprises lower order bits of said address.

12. The first IC as claimed in claim 10, wherein another part of said address is copied to at least one of the boot region register and the address translator register.

13. The first IC as claimed in claim 12, wherein said boot logic circuitry comprises a multiplexer configured to select one of said boot region register and said address translation unit register as an output.

14. The first IC as claimed in claim 13, wherein said multiplexer is controlled based upon a part of said address.

15. The first IC as claimed in claim 14, wherein said multiplexer is controlled based upon said other part of said respective second type addresses.

16. The first IC as claimed in claim 12, wherein said other part of said address is in a middle region of said address.

17. The first IC as claimed in claim 10, wherein at least some bits of at least one of said boot region register and said address translator register are constant.

18. The first IC as claimed in claim 17, wherein said at least some bits of said boot region register and said address translator register comprise higher order bits.

19. The first IC as claimed in claim 17, wherein said at least some bits of said boot region register and said address translator register are hardwired.

20. The first IC as claimed in claim 1, wherein said boot logic circuitry is configured to map said boot transaction to said boot region, said boot region being at a bottom of the second memory space.

21. An electronic device comprising:
a first integrated circuit (IC) having a first memory space; and
a second IC coupled to the first IC and having a second memory space, said second memory space being different from said first memory space;
said first IC comprising
an interface configured to receive a plurality of transactions with respective second type addresses from said second IC,
an address translator configured to translate the respective second type addresses to the first memory space, and
boot logic circuitry configured to determine if a given transaction is a boot transaction, then map the boot transaction from said plurality of transactions to a boot region in said first memory space, the boot region comprising boot code for the second IC.

22. The electronic device as claimed in claim 21, wherein said address translator comprises memory having a plurality of entries, each entry comprising input addresses receivable in said plurality of transactions and respective translated output addresses.

23. The electronic device as claimed in claim 21, wherein said address translator operates in a first mode in which said address translator is disabled for translation and a second mode in which said address translator is enabled for translation.

24. The electronic device as claimed in claim 23, wherein said address translator is configured to provide a signal to said interface indicating if said address translator is in said first mode or said second mode.

25. The electronic device as claimed in claim 23, wherein said interface is configured to pass the plurality of transactions to said address translator when said address translator is in the second mode.

26. The electronic device as claimed in claim 23, wherein said interface is configured to pass the plurality of transactions to said boot logic circuitry when said address translator is in the first mode.

27. The electronic device as claimed in claim 23, wherein when said address translator is in the first mode, said interface is configured to pass said boot transaction to said boot logic circuitry.

28. The electronic device as claimed in claim 27, wherein said boot logic circuitry is configured to determine whether the given transaction includes an address translation operation.

29. A method of operating a first integrated circuit (IC) having a first memory space, the method comprising:
  operating an interface to receive a plurality of transactions with respective second type addresses from a second IC having a second memory space;
  operating an address translator to translate the respective second type addresses to the first memory space, the second memory space being different from the first memory space; and
  operating boot logic circuitry to determine if a given transaction is a boot transaction, then map the boot transaction from the plurality of transactions to a boot region in the first memory space, the boot region comprising boot code for the second IC.

30. The method as claimed in claim 29, wherein the address translator comprises memory having a plurality of entries, each entry comprising input addresses receivable in the plurality of transactions and respective translated output addresses.

31. The method as claimed in claim 29, further comprising operating the address translator in a first mode in which the address translator is disabled for translation and a second mode in which the address translator is enabled for translation.

32. The method as claimed in claim 31, further comprising operating the address translator to provide a signal to the interface indicating if the address translator is in the first mode or the second mode.

33. The method as claimed in claim 31, further comprising operating the interface to pass the plurality of transactions to the address translator when the address translator is in the second mode.

34. The method as claimed in claim 31, further comprising operating the interface to pass the plurality of transactions to the boot logic circuitry when the address translator is in the first mode.

35. The method as claimed in claim 31, further comprising operating, when the address translator is in the first mode, the interface to pass the boot transaction to the boot logic circuitry.

36. The method as claimed in claim 35, further comprising operating the boot logic circuitry to determine whether the given transaction includes an address translation operation.

37. The method as claimed in claim 35, further comprising operating, when the given transaction includes an address translation operation, the boot logic circuitry to direct the given transaction to the address translation unit.

38. The method as claimed in claim 35, wherein the boot logic circuitry comprises a boot region register and an address translator register; and further comprising operating the boot logic circuitry to copy at least part of an address of given transaction to at least one of the boot region register and the address translator register.

39. The method as claimed in claim 38, wherein the at least part of the address comprises lower order bits of the address.

40. The method as claimed in claim 38, wherein another part of the address is copied to at least one of the boot region register and the address translator register.

* * * * *

UNITED STATES PATENT AND TRADEMARK OFFICE
CERTIFICATE OF CORRECTION

| | | |
|---|---|---|
| PATENT NO. | : 9,026,774 B2 | Page 1 of 1 |
| APPLICATION NO. | : 13/560294 | |
| DATED | : May 5, 2015 | |
| INVENTOR(S) | : Jones et al. | |

It is certified that error appears in the above-identified patent and that said Letters Patent is hereby corrected as shown below:

In the Claims

Column 9, Line 40, Claim 1        Delete: "from to said"
                                  Insert: --from said--

Column 10, Line 11, Claim 9       Delete: "transaction said"
                                  Insert: --transaction to said--

Column 10, Line 15, Claim 10      Delete: "of given"
                                  Insert: --of a given--

Column 12, Line 35, Claim 35      Delete: "of given"
                                  Insert: --of a given--

Signed and Sealed this
Twenty-second Day of September, 2015

Michelle K. Lee
*Director of the United States Patent and Trademark Office*